(12) United States Patent
Tsurumi

(10) Patent No.: US 8,002,097 B2
(45) Date of Patent: Aug. 23, 2011

(54) CLUTCH MECHANISM OF AN OUTBOARD MOTOR

(75) Inventor: Haruhiko Tsurumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 798 days.

(21) Appl. No.: 12/023,365

(22) Filed: Jan. 31, 2008

(65) Prior Publication Data

US 2008/0194157 A1 Aug. 14, 2008

(30) Foreign Application Priority Data

Feb. 9, 2007 (JP) .................................. 2007-031053

(51) Int. Cl.
*F16D 21/04* (2006.01)
*F16D 11/10* (2006.01)
*B63H 23/08* (2006.01)

(52) U.S. Cl. .................... 192/48.91; 192/51; 192/69.83; 192/108; 440/75

(58) Field of Classification Search ............... 192/69.82, 192/69.83
See application file for complete search history.

(56) References Cited

U.S. PATENT DOCUMENTS

| 4,527,441 A * | 7/1985 | Nakahama | 74/378 |
| 4,820,210 A * | 4/1989 | Dretzka | 440/75 |
| 5,791,950 A * | 8/1998 | Weronke et al. | 440/75 |
| 6,893,305 B2 | 5/2005 | Natsume et al. | |

* cited by examiner

*Primary Examiner* — Richard M. Lorence
(74) *Attorney, Agent, or Firm* — Keating & Bennett, LLP

(57) ABSTRACT

A clutch mechanism of an outboard motor includes a forward gear and a reverse gear that are always driven in opposite directions by a drive shaft driven by a drive system, and a dog gear disposed around the output shaft. The forward gear, the reverse gear, and the dog gear are provided with a plurality of engaging projections and engaging recesses that can be engaged with each other, with the dog gear being engaged with either the forward gear or with the reverse gear by forceably moving the dog gear toward one side in the axial direction. A drive shaft has a drive gear and is driven by the drive system generating a maximum output power of about 300 ps or more, the forward gear and the reverse gear have input gears respectively which are always engaged with the drive gear, and the engaging projections and the engaging recesses are located radially inside of the input gears and disposed at least seven in a row along a circumference thereof.

6 Claims, 14 Drawing Sheets

CLUTCH MECHANISM OF AN OUTBOARD MOTOR

BACKGROUND OF THE INVENTION

1. Field of the Invention

The present invention relates to a clutch mechanism of an outboard motor for transmitting a driving force from a drive shaft or an input shaft rotationally driven by a drive system to an output shaft, and particularly relates to an improvement in the engagement condition between a forward gear and a reverse gear driven by the drive shaft, and a dog gear connected to the output shaft.

2. Description of the Related Art

In a conventional outboard motor 60 shown in FIG. 14, an engine (not shown) serves as a drive system above a casing 61, a drive shaft 62 is arranged vertically and driven by the engine, a clutch mechanism 64 is connected to a drive gear 63 at the lower end of the drive shaft62, and an output shaft 66 having a propeller 65 is connected to the clutch mechanism 64.

The clutch mechanism 64 has a forward gear 67 and a reverse gear 68 that are disposed for free rotation around the output shaft 66 and always driven to rotate in opposite directions by the drive gear 63 on the drive shaft 62, as well as a dog gear 69 provided around the output shaft 66 between the forward gear 67 and the reverse gear 67 to be rotationally immovable in the circumferential direction relative to the output shaft 66.

In the clutch mechanism 64, the dog gear 69 is engaged with either of the forward gear 67 or the reverse gear 68 by moving the dog gear 69 either toward the forward gear 67 or toward the reverse gear 68, wherein the driving force of one of the gears 67, 68 is transmitted to the output shaft 66, and the propeller 65 is thus rotated for forward or backward traveling.

In the clutch mechanism 64 of the outboard motor 60, as shown in FIGS. 15 and 16, engaging recesses 69a are provided on both sides of the dog gear 69 on the surfaces facing the forward gear 67 and the reverse gear 68, respectively, and engaging projections 67a, 68a are provided on the forward gear 67 and the reverse gear 68 on the areas facing the engaging recesses 69a. As the forward gear 67 or the reverse gear 68 is engaged, the engaging projections 67a, 68a are located within the engaging recesses 69a, with driving force transmitting surfaces 67b, 68b on the engaging projections 67a, 68a being abutted with driving force transmitting surfaces 69b in the engaging recesses 69a to transmit the driving force.

One of the well-known types of such a clutch mechanism for an outboard motor is described in JP-A-2005-48820, for instance. The noise emitted by the driving train is reduced by designing the engaging projections 67a, 68a and the engaging recesses 69a to have approximately the same lengths in the circumferential direction.

In the conventional clutch mechanism, however, the large output power of the engine sometimes causes breakage, cracks, deformations, and other damage to portions of the engaging projections 67a, 68a and the engaging recesses 69a when the forward gear 67 or the reverse gear 68 is engaged with the dog gear 69, or when the driving force is transmitted in the engaged state.

SUMMARY OF THE INVENTION

In order to overcome the problems described above, preferred embodiments of the present invention provide a clutch mechanism of an outboard motor having improved durability of the engaging projections and engagement recesses when engaging the forward gear or the reverse gear with the dog gear, and when transmitting a driving force.

A first preferred embodiment of the present invention includes a clutch mechanism of an outboard motor including a forward gear and a reverse gear which are disposed for free rotation around an output shaft to drive a propeller and driven by a drive shaft to rotate in opposite directions, and a dog gear disposed around the output shaft between the forward gear and the reverse gear, the dog gear being movable in the axial direction of the dog gear relative to the output shaft and rotationally immovable in the circumferential direction of the dog gear. A plurality of engaging projections and engaging recesses are arranged to be engaged with each other in engaging areas located on the forward and the reverse gear facing the dog gear, and also located on the dog gear facing the forward and the reverse gear. The dog gear is engaged with either the forward gear or with the reverse gear by forceably moving toward one side in the axial direction relative to the output shaft, resulting in the plurality of engaging recesses being engaged with the plurality of engaging projections to drive the output shaft, wherein the drive shaft rotates with the drive gear fixed to the end of the drive shaft on the output shaft side. The engaging projections and the engaging recesses are located radially inside an area of the input gears and preferably include at least seven in a row along the circumference thereof. At the time of engagement, transmitted torque is dispersed to driving force transmitting surfaces composed of surfaces of the engaging projections and the engaging recesses facing each other in the circumferential direction.

Regarding each engagement area of the forward gear and the dog gear and each engagement area of the reverse gear and the dog gear, the aggregate area of all the driving force transmitting surfaces is preferably at least about 340 $mm^2$, for example.

Regarding each engagement area of the forward gear and the dog gear and each engagement area of the reverse gear and the dog gear, the outer edge on each driving force transmitting surface is preferably arranged to be aligned in the direction substantially perpendicular to the axial direction of the output shaft, and the aggregate length of all the outer edges on the engagement areas preferably is at least about 70 mm, respectively, for example.

Regarding each engagement area of the forward gear and the dog gear and each engagement area of the reverse gear and the dog gear, a slope is preferably provided on the top of the engaging projections between the engaging recesses of at least one of the forward gear and the dog gear and at least one of the reverse gear and the dog gear for guiding the engaging projections into the engaging recesses of the other.

Regarding each of the engagement areas on the forward gear and the reverse gear facing each other, the engaging projections and the engaging recesses are preferably located radially inside an area of the input gear, in which all of the engaging projections and the engaging recesses are provided in the limited space between the input gear and the output shaft. Consequently, the dimensions of the engaging projections and the engaging recesses are significantly restricted. However, the durability of the engaging projections and the engaging recesses are improved despite such a restricted space, because preferably seven or more of the engaging projections and the engaging recesses are provided, and at the time of engagement, the transmitted torque is dispersed to the driving force transmitting surfaces composed of the surfaces on the engaging projections and the engaging recesses facing each other in the circumferential direction.

Regarding the engagement areas between the forward gear and the dog gear, or the engagement areas between the reverse gear and the dog gear, the aggregate area of the driving force transmitting surface preferably exceeds the predetermined value, to allow adequate dispersion of the transmitted torque and to improve the durability of the engaging projections and the engaging recesses.

Regarding the engagement areas between the forward gear and the dog gear, or the engagement areas between the reverse gear and the dog gear, the axially outer edges on the driving force transmitting surfaces are preferably arranged to be aligned in the direction substantially perpendicular to the axial direction of the output shaft, and the aggregate length of the outer edges on the engagement area preferably exceeds the predetermined value, the impact caused by the mutual abutting of the areas in the vicinity of the outer edges of the driving force transmitting surfaces can be dispersed when the forward gear or the reverse gear is engaged with the dog gear.

Regarding the engagement areas between the forward gear and the dog gear, or the engagement areas between the reverse gear and the dog gear, a slope is preferably provided on the top of the engaging projection between the engaging recesses on at least one of the engaging gears to guide the engaging projections on the mating gear into the relevant engaging recesses. Thus, even when at least seven of the engaging projections and the engaging recesses are provided respectively, resulting in a small pitch, once the engaging projections are abutted with pressure on the tops adjacent to the engaging recesses, the engaging projections on the tops are guided by the slopes to slide down and allow easy engagement with the respective engaging recesses when the engaging recesses and the engaging projections rotating in different speeds are engaged with each other.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will now be described with reference to FIGS. 1 through 12.

Figure 1:
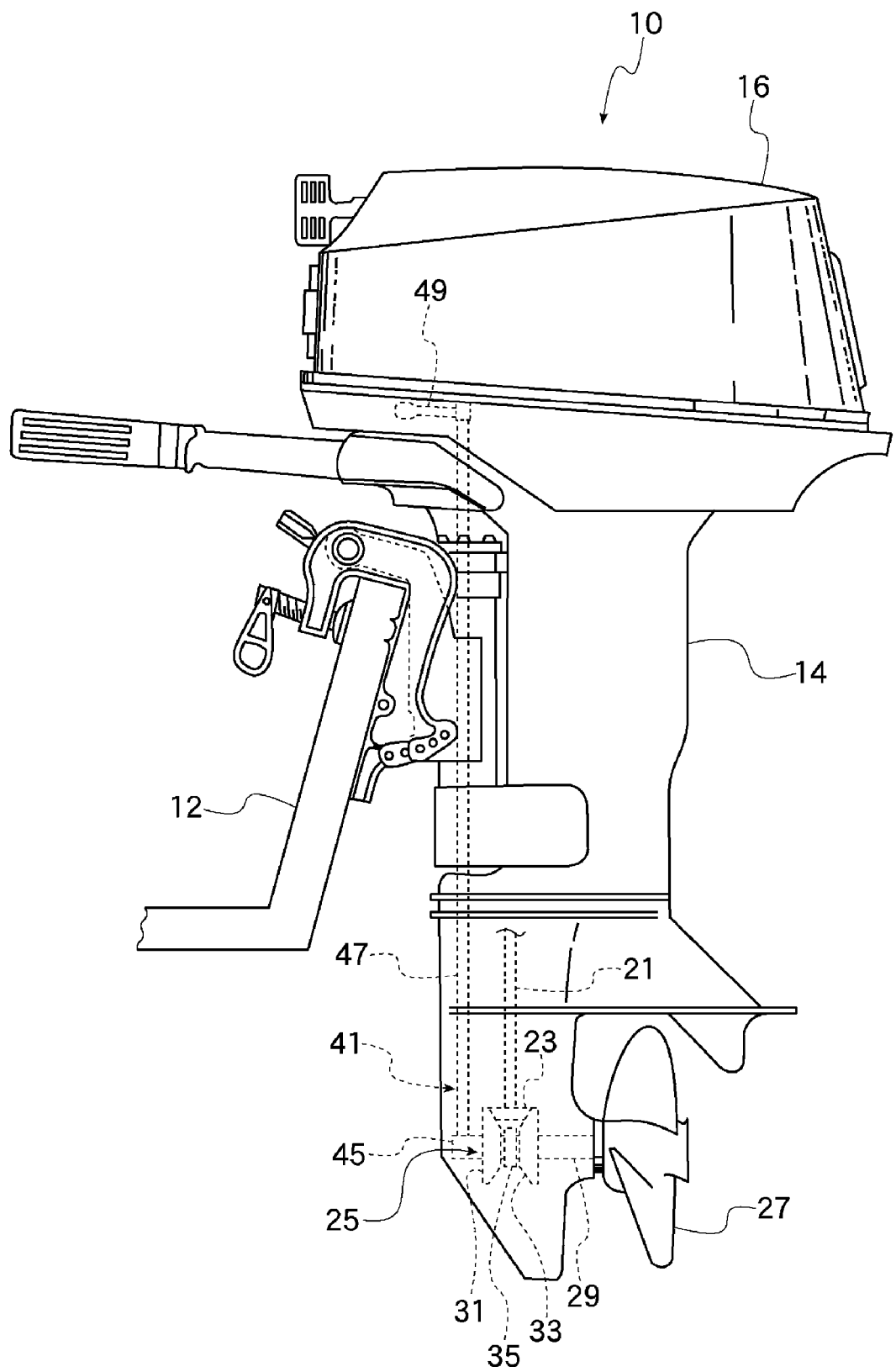
FIG. 1 is a side view of an outboard motor equipped with a clutch mechanism according to a preferred embodiment of the present invention.
Figure 2:
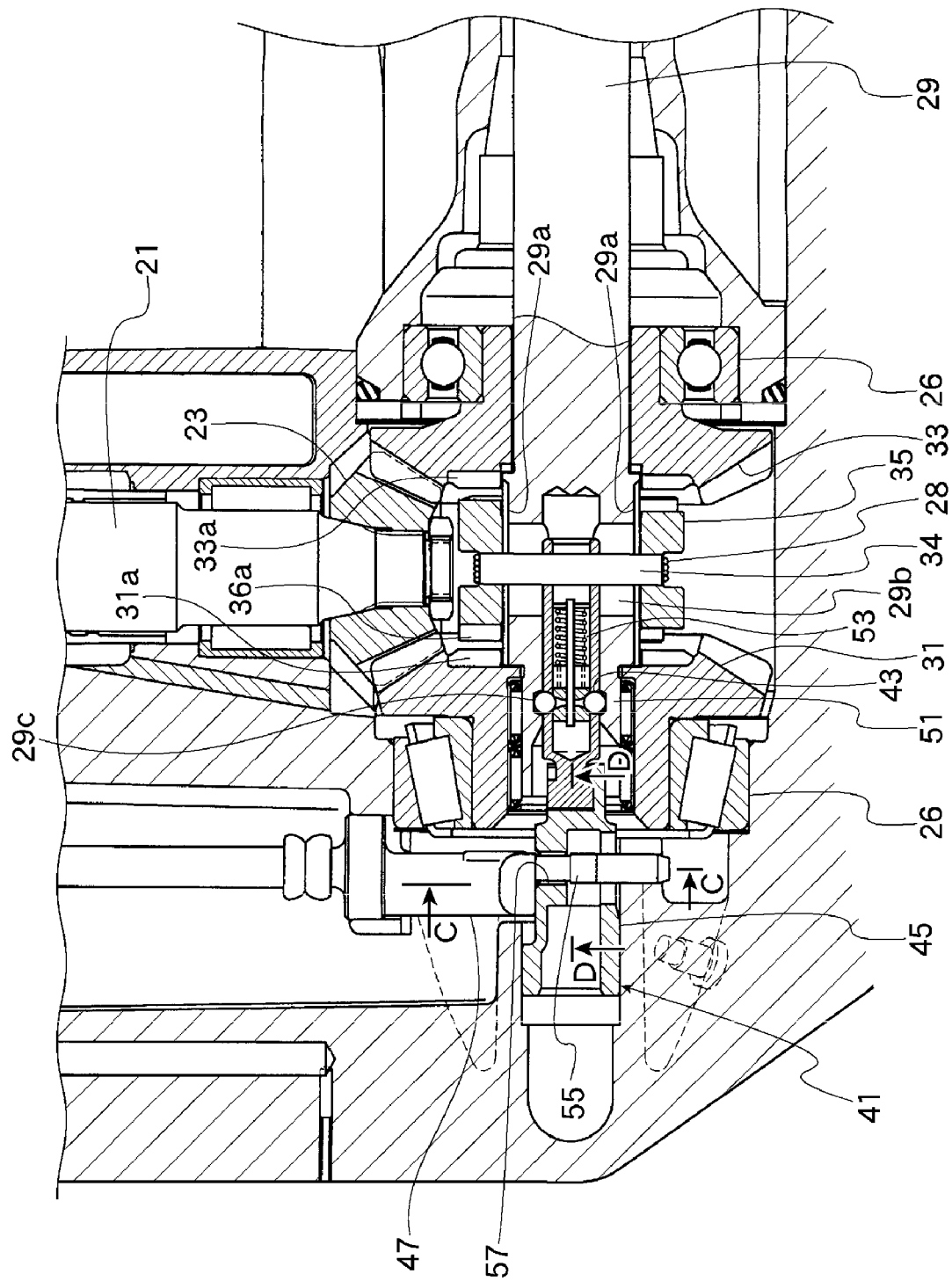
FIG. 2 is a sectional view of a clutch mechanism of an outboard motor according to a preferred embodiment of the present invention.

In FIGS. 1 and 2, reference numeral 10 denotes an outboard motor, in which an engine (not shown) covered by a cowling 16 is installed to serve as a drive system above a casing 14 that is fixed to a boat hull 12. The engine preferably has, for example, a maximum output power of 300 ps or larger. A drive shaft 21 driven by the engine is mounted vertically within the casing 14. A drive gear 23 integrally rotatable with the drive shaft 21 is provided at the lower end of the drive shaft 21. A clutch mechanism 25 joined to the drive gear 23 of the drive shaft 21 is disposed in the lower portion of the casing 14.

The clutch mechanism 25 has a forward gear 31 and a reverse gear 33 disposed for free rotation around the output shaft 29 for engaging with the drive gear 23 provided at the lower end of the drive shaft 21, and a dog gear 35 positioned between the forward gear 31 and the reverse gear 33 and coupled with the output shaft 29 to allow engagement with the forward gear 31 or with the reverse gear 33 alternatively by being moved in the axial direction of the output shaft 29.

Figure 3:
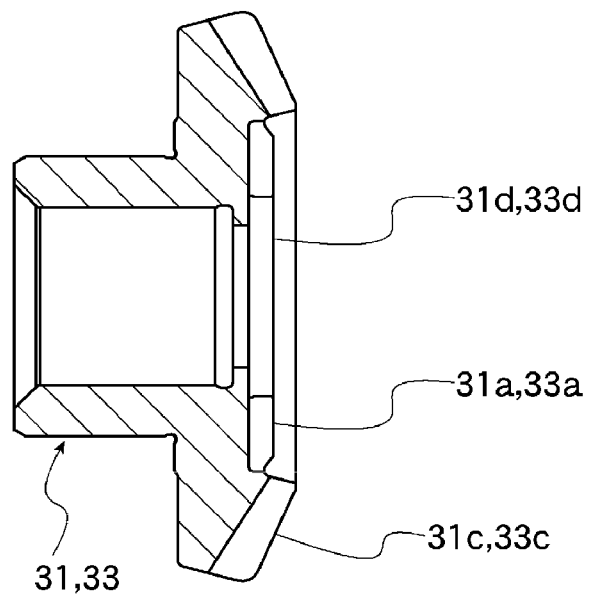
FIG. 3 is a sectional view of a forward gear and a reverse gear of the clutch mechanism according to a preferred embodiment of the present invention.
Figure 4:
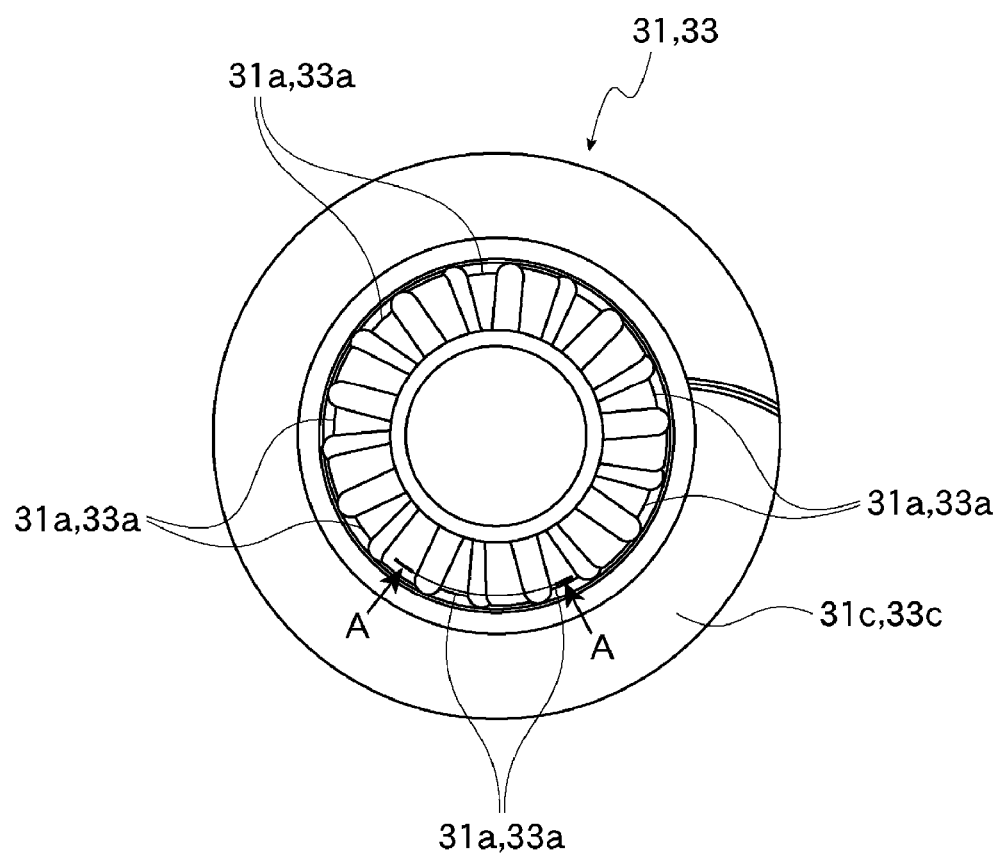
FIG. 4 is a front view of the forward gear and the reverse gear of the clutch mechanism according to a preferred embodiment of the present invention.
Figure 5:
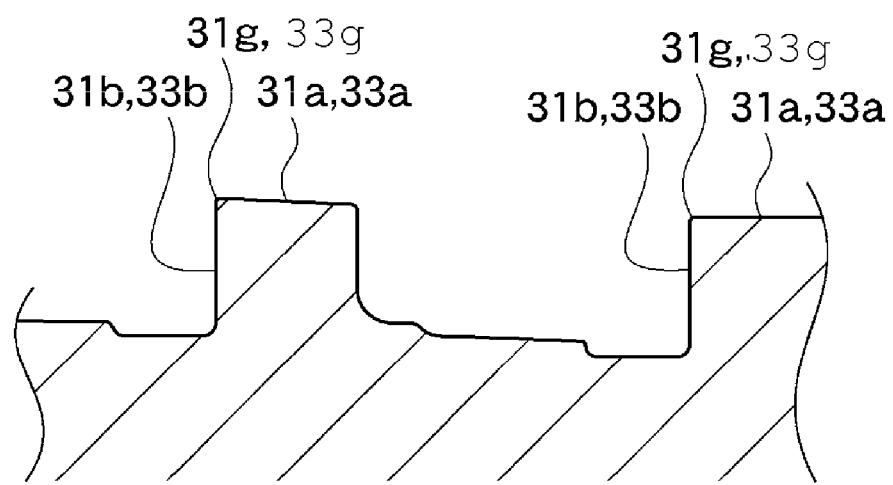
FIG. 5 is a sectional view obtained by cutting away in the circumferential direction along a line A-A in FIG. 4 according to a preferred embodiment of the present invention.
Figure 6:
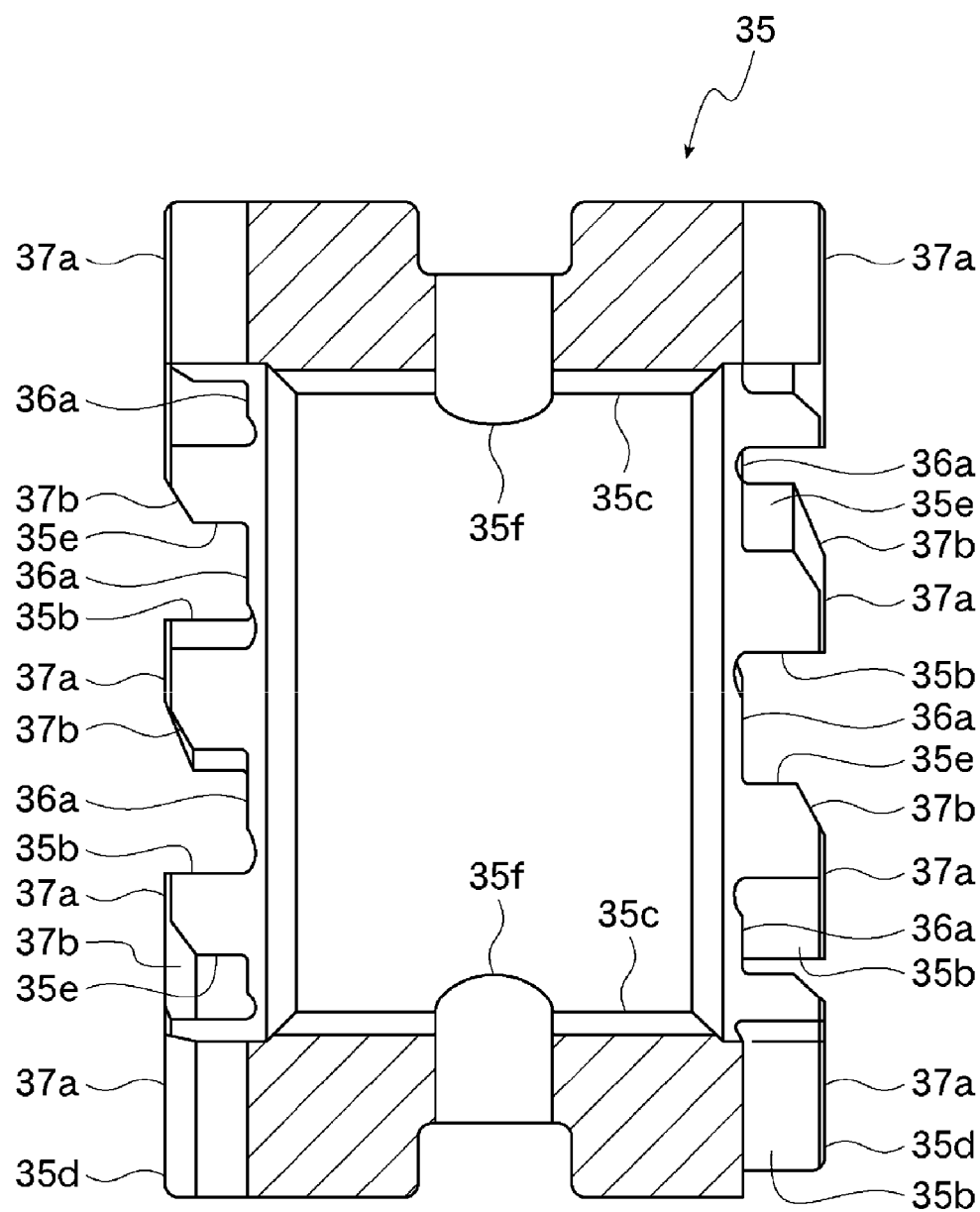
FIG. 6 is a sectional view of a dog gear of the clutch mechanism according to a preferred embodiment of the present invention.
Figure 7:
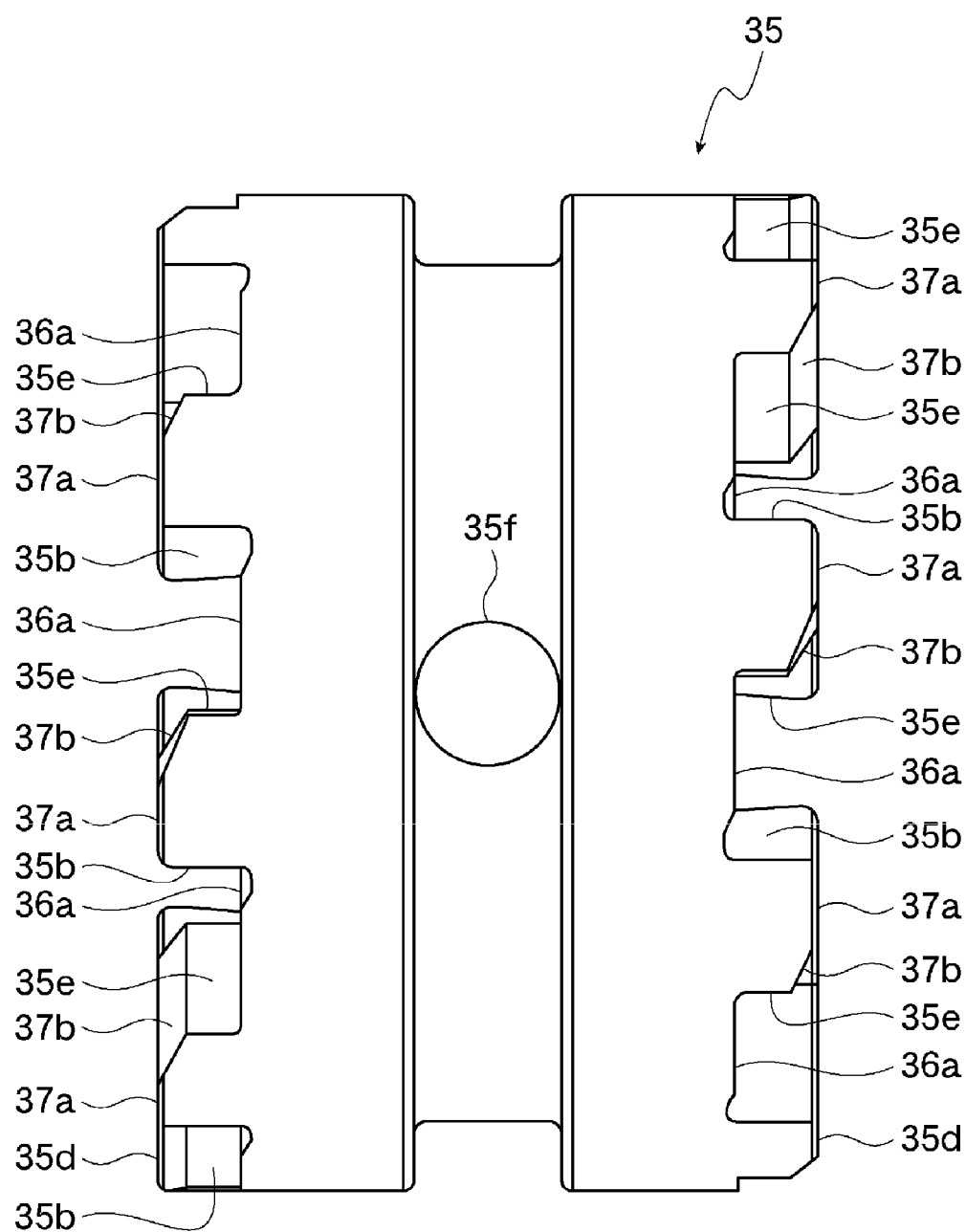
FIG. 7 is a plan view of the dog gear of the clutch mechanism according to a preferred embodiment of the present invention.
Figure 8:
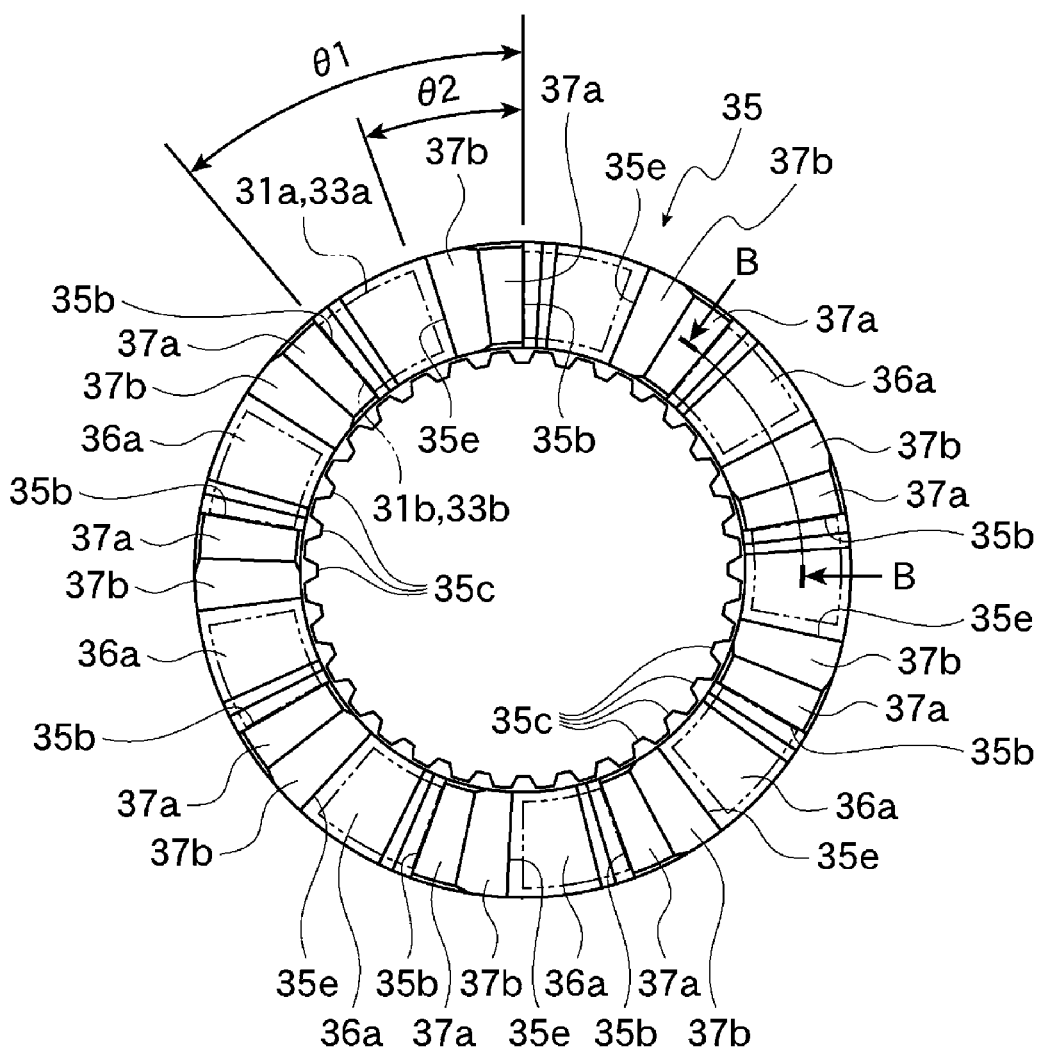
FIG. 8 is a front view of the dog gear of the clutch mechanism according to a preferred embodiment of the present invention.

As shown in FIGS. 3 through 5, the forward gear 31 and the reverse gear 33 have input gears 31c, 33c on the periphery of one side to which the driving force is input from the drive gear 23, as well as engagement areas 31d, 33d located radially inside of the input gears 31c, 33c opposite to the dog gear 35 and capable of meshing with the dog gear 35. The forward gear 31 and the reverse gear 33 are held by the bearings 26 fixed on the casing 14 to allow free rotation around the output shaft 29 without being joined to the output shaft 29. In addition, the forward gear 31 and the reverse gear 33 are always engaged with the drive gear 23 on the drive shaft 21, to be driven in opposite directions to each other by the rotation of the drive shaft 21.

As shown in FIGS. 6 through 9, the dog gear 35 is disposed around the output shaft 29 between the forward gear 31 and the reverse gear 33, and has a generally cylindrical shape provided with engagement areas 35d opposite to the forward gear 31 and the reverse gear 33 capable of meshing with the forward gear 31 and the reverse gear 33. Spline teeth 35c are provided on the internal periphery of the dog gear 35 in its axial direction.

In regard to the dog gear 35, the spline teeth 35c provided along the axis of the dog gear 35 are engaged with the spline teeth 29a provided on the output shaft 29 in the axial direction, and a locking pin 34 of a switching mechanism 41, as described later, is inserted through a long hole 29b provided along the axis of the output shaft 29 and a pass-through hole 35f of the dog gear 35, and stopped in an engaged state by a coil spring 28. In this way, the dog gear 35 is coupled to the output shaft 29 to be movable in the axial direction.

In addition, the dog gear 35 is coupled to the output shaft 29 to be rotationally immovable in the circumferential direction by the spline teeth 35c on the dog gear 35 being engaged with the spline teeth 29a provided on the output shaft 29 along the axis of the output shaft 29.

Figure 9:
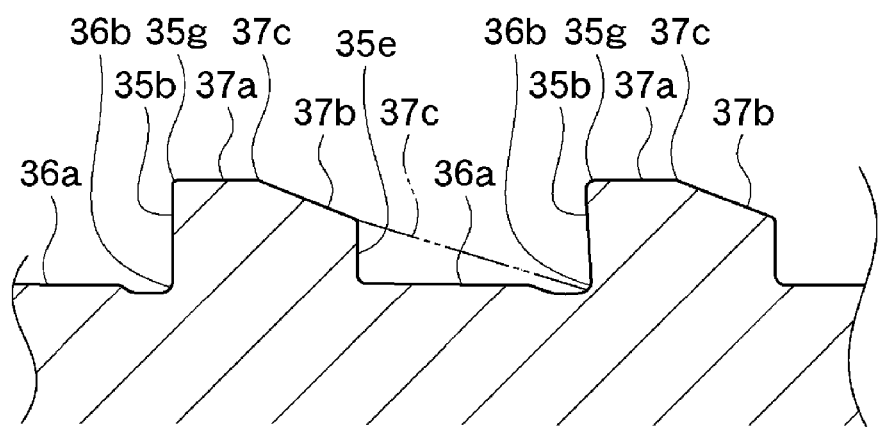
FIG. 9 is a sectional view obtained by cutting away in the circumferential direction along a line B-B in FIG. 8 according to a preferred embodiment of the present invention.

Further, in the engaging areas 31d, 33d on the forward gear 31 and the reverse gear 33, multiple engaging projections 31a, 33a, as shown in FIG. 5, are disposed evenly in the circumferential direction, while in the engaging areas 35d on the dog gear 35, engaging recesses 36a, as shown in FIG. 9, are disposed at the same pitch as the engaging projections 31a, 33a.

The engaging projections 31a, 33a, and the engaging recesses 36a are provided in a position radially inside of the input gears 31c, 33c and radially outside of the output shaft 29. It is preferred that they are provided in the range of about 20 mm to about 32 mm, for example, on a radius around the center axis of the output shaft 29. If the inner radius of this range is too small, an insufficient diameter of the output shaft 29 often means an insufficient strength of the output shaft 29 which cannot handle the driving force generated by the engine of 300 ps or larger. On the other hand, if the outer radius of this range is too large, the outer diameter of the input gears 31c, 33c on the forward gear 31 and the reverse gear 33 becomes larger, often resulting in a large clutch mechanism 25 and a bigger outboard motor 10.

When driven by an engine of 300 ps or larger, at least seven (7), for example, each of the engaging projections 31a, 33a, and the engaging recesses 36a are preferred. Also, it is preferable to limit the number to ten (10) at the maximum. Too many engaging projections 31a, 33a, and too many engaging recesses 36a are not preferable because the engagement impact will increase when they mesh with each other. It is preferable that eight (8), nine (9), or ten (10) engaging projections 31a, 33a, and engaging recesses 36a are provided, respectively. The provision of nine (9) each, as is the case for the present preferred embodiment, is preferable.

The engaging projections 31a, 33a of the forward gear 31 and the reverse gear 33, respectively, have driving force transmitting surfaces 31b, 33b in their front portion relative to the driving direction, which face and abut against the engaging recesses 36a of the dog gear 35 in the circumferential direction when the engaging projections 31a, 33a are meshed with the dog gear 35. On the other hand, the engaging recesses 36a of the dog gear 35 have driving force transmitting surfaces 35b in their rear portion relative to the driving direction, which face and abut against the engaging projections 31a, 33b of the forward gear 31 and the reverse gear 33, respectively, in the circumferential direction when the engaging recesses 36a are meshed with the forward gear 31 and the reverse gear 33.

In the clutch mechanism 25, the aggregate area of all the driving force transmitting surfaces 31b of the engaging projections 31a on the engagement area 31d of the forward gear 31, and the aggregate area of all the driving force transmitting surfaces 35b of the engaging recesses 36a on the engagement area 35d of the dog gear 35 are preferably about 340 mm$^2$ or larger, and more preferably, about 394.625 mm$^2$ or larger, for example.

In addition, the aggregate area of all the driving force transmitting surfaces 33b of the engaging projections 33a on the engagement area 33d of the reverse gear 33, and the aggregate area of all the driving force transmitting surfaces 35b of the engaging recesses 36a on the engagement area 35d of the dog gear 35 are preferably about 340 mm$^2$ or larger, and more preferably, about 394.625 mm$^2$ or larger, for example.

Here, either the aggregate area of the driving force transmitting surfaces 31b of the forward gear 31 and the aggregate area of the driving force transmitting surfaces 35b facing the forward gear 31, or the aggregate area of the driving force transmitting surfaces 33b of the reverse gear 33 and the aggregate area of the driving force transmitting surfaces 35b facing the reverse gear 33 may be larger than the value specified above. However, it is especially preferable if both of these aggregate areas are larger than the specified value.

This is because as long as the driving force transmitting surface 31b, the driving force transmitting surface 33b, and the driving force transmitting surface 35b fall within the specified range, the transmitted torque can be dispersed well enough when the forward gear 31 or the reverse gear 33 is engaged with the dog gear 35, and possible damage to the engaging projections and the engaging recesses can be prevented more effectively.

Also in the clutch mechanism 25, the engaging projections 31a, 33a, and the engaging recesses 36a are respectively arranged to have a pitch $\theta 1$ of about 40 degrees about the output shaft 29. The length along the circumference for the engaging projections 31a, 33a and the engaging recesses 36a is designed to fall within the range from about 12 degrees to about 23 degrees about the center axis of the output shaft 29. This is because sufficient strength that can handle the driving force from the engine of 300 ps or larger output power can be secured by the dimensions in this range.

In this case, it is preferable that the engaging projections 31a, 33a are arranged to have a length along the circumference smaller than that of the engaging recesses 36a by about 1 degree to about 12 degrees in terms of the angle about the center axis of the output shaft 29. This is to make the engagement easier. Furthermore, it is preferable to provide at least about 20 degrees for the angle $\theta 2$ that is the difference between the approximately 40 degree pitch and the length along the circumference of the engaging projections 31a, 33a. This helps ensure the easy engagement of the engaging projections with the engaging recesses.

Further, in the clutch mechanism 25, outer edges 31g, 33g at the end closest to the dog gear 35 on each of the driving force transmitting surface 31b, 33b; outer edges 35g at the end closest to the forward gear 31 on each of the driving force transmitting surfaces 35b on the forward gear 31 side of the dog gear 35; and outer edges 35g at the end closest to the reverse gear 33 on each of the driving force transmitting surfaces 35b on the reverse gear 33 side of the dog gear 35 are all preferably arranged to be aligned in the direction substantially perpendicular to the axial direction of the output shaft.

In this case, the aggregate length of the outer edges 31g of all the driving force transmitting surfaces 31b on the engagement area 31d of the forward gear 31, and the aggregate length of the outer edges 35g of all the driving force transmitting surfaces 35b on the engagement area 35d of the dog gear 35 to be engaged with the engagement area 31d of the forward gear 31, are preferably about 70 mm or longer, more preferably about 71.75 mm or longer, for example.

The aggregate length of the outer edges 33g of all the driving force transmitting surface 33b on the engagement area 33d of the reverse gear 33, and the aggregate length of the outer edges 35g of all the driving force transmitting surface 35b on the engagement area 35d of the dog gear 35 to be engaged with the engagement area 33d of the reverse gear 33, are preferably about 70 mm or longer, more preferably about 71.75 mm or longer, for example.

Here, either the aggregate length of the outer edges 31g on the driving force transmitting surfaces 31b of the forward gear 31 and the aggregate length of the outer edges 35g on the driving force transmitting surfaces 35b on the forward gear 31 side of the dog gear 35, or the aggregate length of the outer edges 33g on the driving force transmitting surface 33b of the reverse gear 33 and the aggregate length of the outer edges 35g on the driving force transmitting surfaces 35b on the reverse gear 33 side of the dog gear 35 may be longer than the value specified above. Alternatively, both of these aggregate lengths may be longer than the specified value. Optimally, it is preferable if both of these aggregate lengths are longer than the specified value.

If the aggregate length in regard to the driving force transmitting surfaces 31b, the driving force transmitting surfaces 33b, and the driving force transmitting surfaces 35b fall within the specified range, the impact caused by the mutual abutting of the areas in the vicinity of outer edges 31g, 33g, and 35g of the driving force transmitting surface 31b, 33b, and 35b can be sufficiently dispersed when the forward gear 31 or the reverse gear 33 is engaged with the dog gear 35.

Also in the clutch mechanism 25, slopes 37b extending to the rear walls 35e are preferably provided to tops 37a which are the engaging projections between the neighboring engaging recesses 36a, namely, the tops 37a in front of each engaging recess 36a relative to the driving direction. The slopes 37b are arranged to incline downward along the driving direction and toward the front relative to the driving direction. In addition, except for the slopes 37b, the tops 37a are preferably arranged to be flat surfaces extending substantially perpendicular to the center axis of the output shaft 29.

Thus, even when seven or more of the engaging projections 31a, 33a and the engaging recesses 36a are provided respectively, resulting in a small pitch θ1 and difficult engagement, the engaging projections 31a, 33a are abutted with pressure on the tops adjacent to the engaging recesses 36a and slide down the slopes 37b to allow the engaging projections 31a, 33a to engage the engaging recesses 36a more easily.

As shown in FIG. 9, it is preferable to provide the slopes 37b to virtually overlap the flat surfaces 37c extending from the bottom 36b in each of the engaging recesses 36a at its front end relative to the driving direction. Such a configuration makes it easier to machine the slopes 37b.

The clutch mechanism 25 is structured so that the dog gear 35 is movable in the axial direction by a switching mechanism 41 connected to the locking pin 34.

Figure 10:
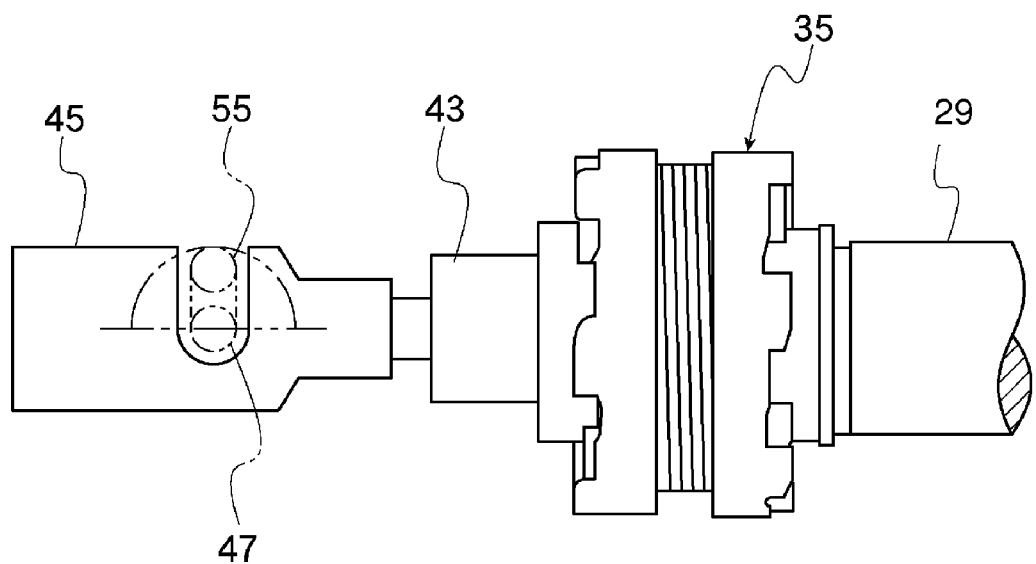
FIG. 10 is a plan view of the dog gear of the clutch mechanism according to a preferred embodiment of the present invention, as the dog gear is installed on an output shaft.
Figure 11:
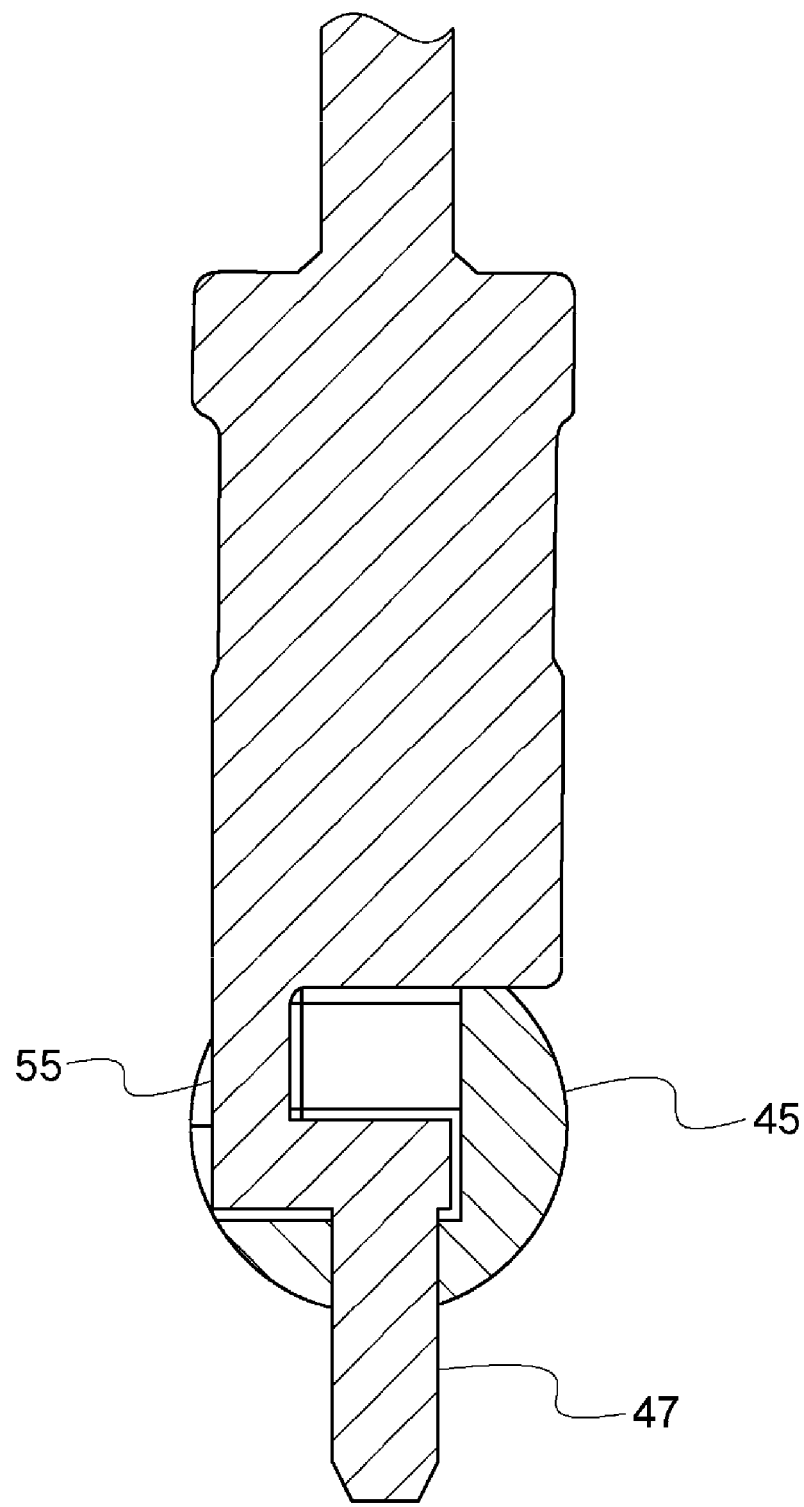
FIG. 11 is a sectional view, taken along the line C-C in FIG. 2 according to a preferred embodiment of the present invention.
Figure 12:
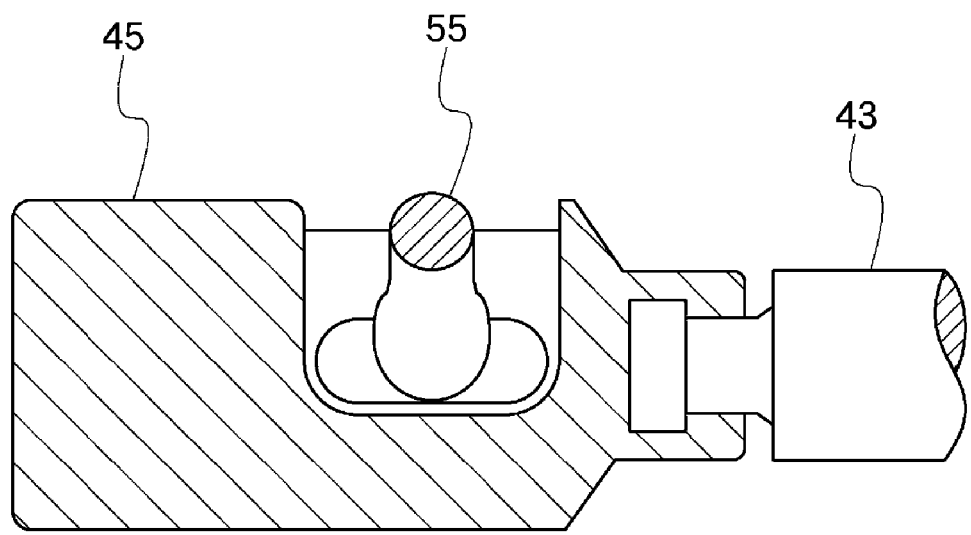
FIG. 12 is a sectional view, taken along the line D-D in FIG. 2 according to a preferred embodiment of the present invention.

As shown in FIG. 2, as well as in FIGS. 10 through 12, the switching mechanism 41 is disposed in the center of the end portion opposite to the propeller 27 on the output shaft 29, and has a shift plunger 43 connected to the locking pin 34 and movable along the axis, a shift follower 45 joined to the end of the shift plunger 43, a shift rod 47 for operating the shift follower 45 in the axial direction from the upper portion of the casing 14, and a shift lever 49 fixed to the upper portion of the shift rod 47 for causing the turning motion of the shift rod 47.

In the shift plunger 43, a locating ball urged by a spring member 53 along the diameter is provided, and is configured so that the locating ball 51 can stop in an engaged state in a stopped area 29c on the output shaft 29 when the dog gear 35 is positioned to not engage with the forward gear 31 or the reverse gear 33.

Also as shown in FIGS. 11 and 12, a cam 55 is provided close to the lower end of the shift rod 47, with the cam 55 being eccentrically connected with the shift follower 45 in reference to the axis of the shift rod 47. A transverse groove 57 is provided in the shift follower where it is connected to the cam 55. The cam 55 can slide within the transverse groove 57. Thus, when the shift rod 47 is turned and the cam 55 swings about the axis of the shift rod 47, the cam 55 presses the transverse groove 57 to move the shift follower 45 and the shift plunger 43 in the axial direction, allowing the dog gear 35 to move along the axis.

On the outboard motor having the clutch mechanism 25 configured as described above, the drive shaft 21 is rotated by the engine, and the forward gear 31 and the reverse gear 33 are rotated in opposite directions by the drive gear 23. Then, as the shift rod 47 is turned by the shift lever 49 to one side for the forward operation, the cam 55 on the shift rod 47 swings to press the transverse groove 57 on the shift follower 45 to one side, causing the shift follower 45 and the shift plunger 43 to move toward the end of the output shaft 29 in the axial direction.

This movement, in turn, causes the dog gear 35 to move toward the end of the output shaft 29 in the axial direction to cause the engagement area 35d on one side of the dog gear 35 to be engaged with the forward gear 31.

At the time of this movement, the forward gear 31 is rotating at the speed corresponding to the engine speed, while the output shaft 29 and the dog gear 35 are rotating at a different speed, including being in the stopped state. In other words, the engaging projections 31a are moving faster than the engaging recesses 36a. Therefore, although the engaging recesses 36a can directly fit in the engaging projections 31a when the engaging recesses 36a are positioned to face the engaging projections 31a, and the dog gear 35 is moved for insertion at a sufficiently high speed in the axial direction, the axial movement of the dog gear 35 usually results in the state as shown in FIGS. 13(a) through 13(e), in which the areas between the neighboring engaging recesses 36a abut against the top surfaces of the engaging projections 31a before they fit therein.

Figure 13:
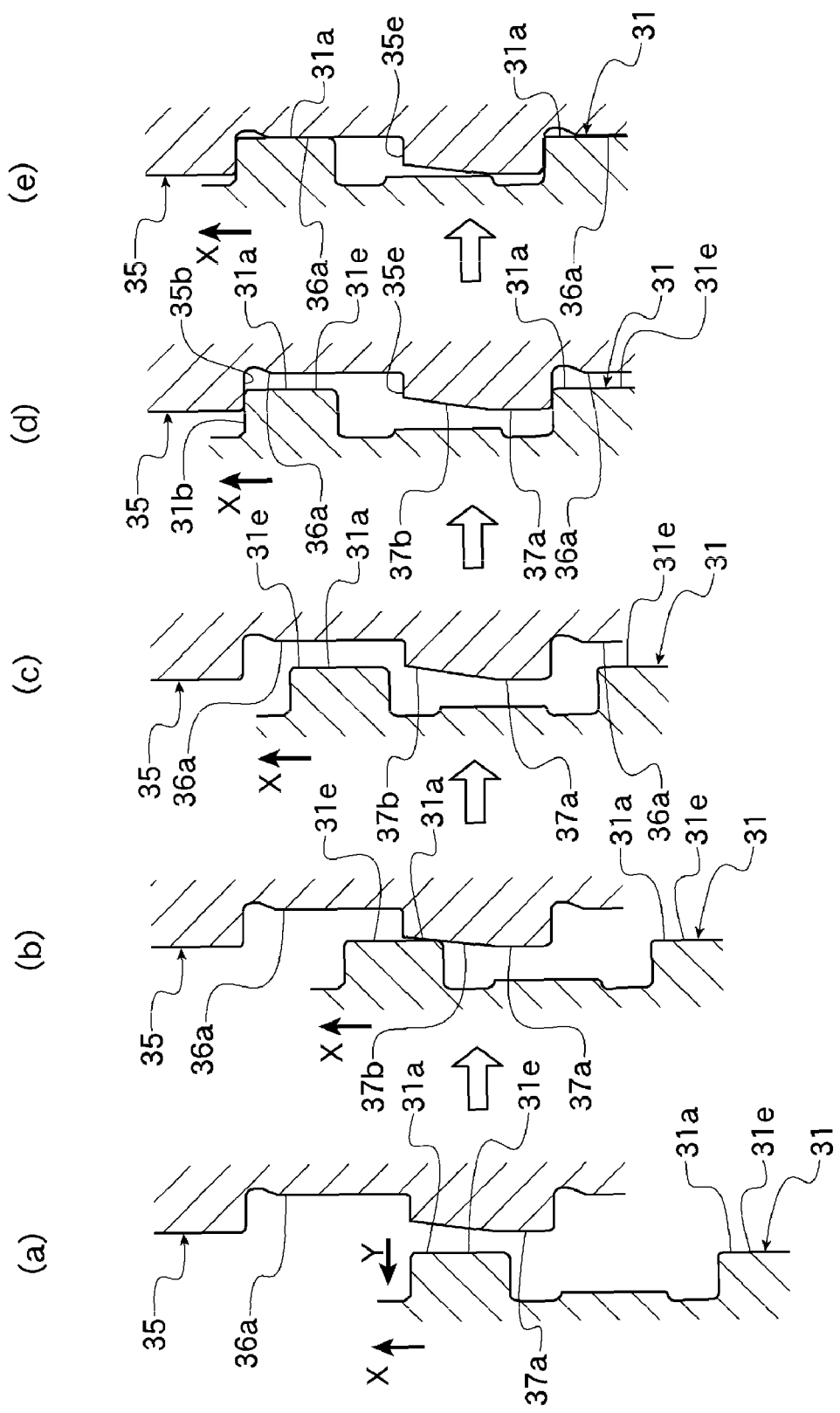
FIGS. 13(a)-(e) are sectional views for describing the engaging behavior of the engaging projections on the forward gear and the reverse gear with the engaging recesses on the dog gear according to a preferred embodiment of the present invention.
Figure 14:
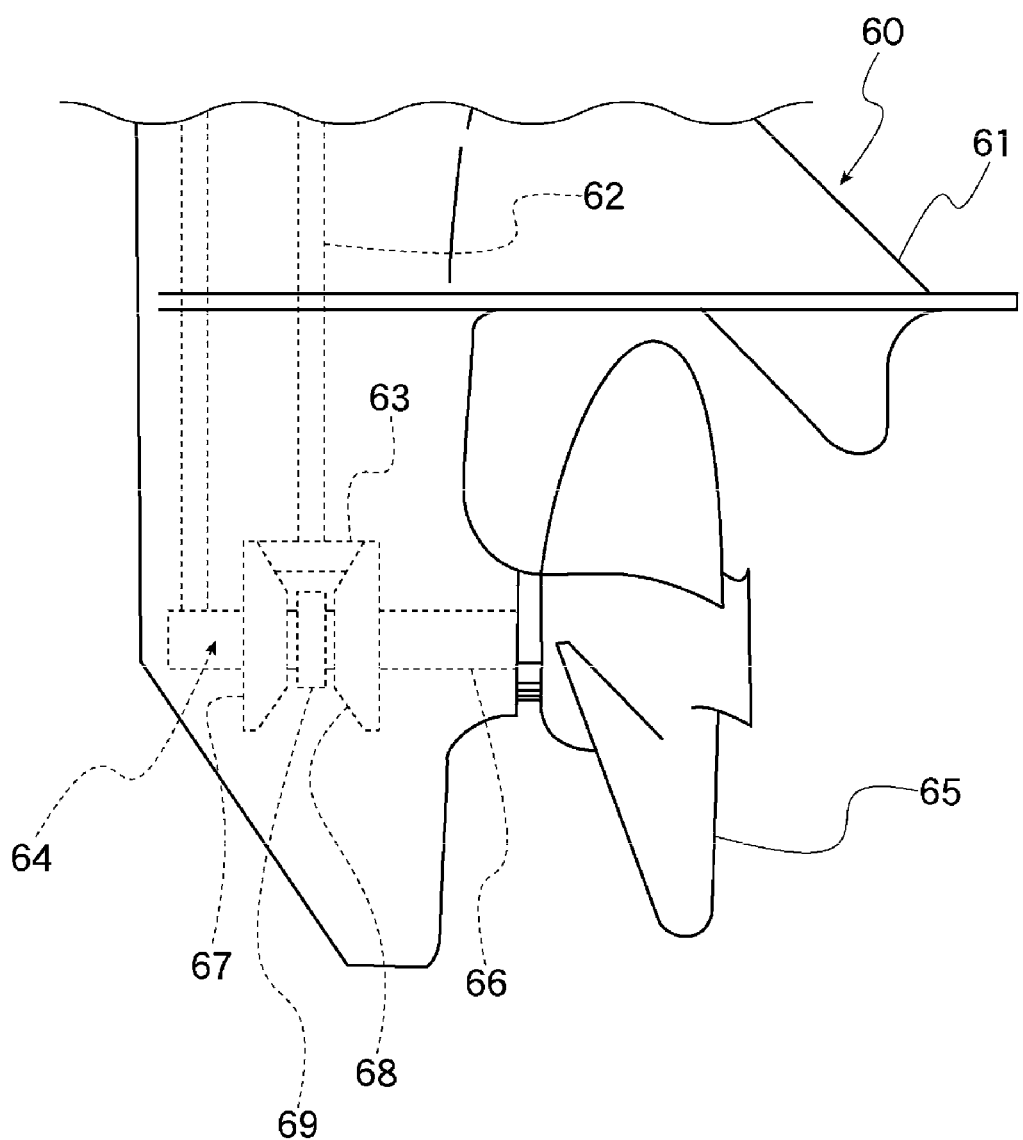
FIG. 14 is a side view, showing the lower portion of a conventional outboard motor.
Figure 15:
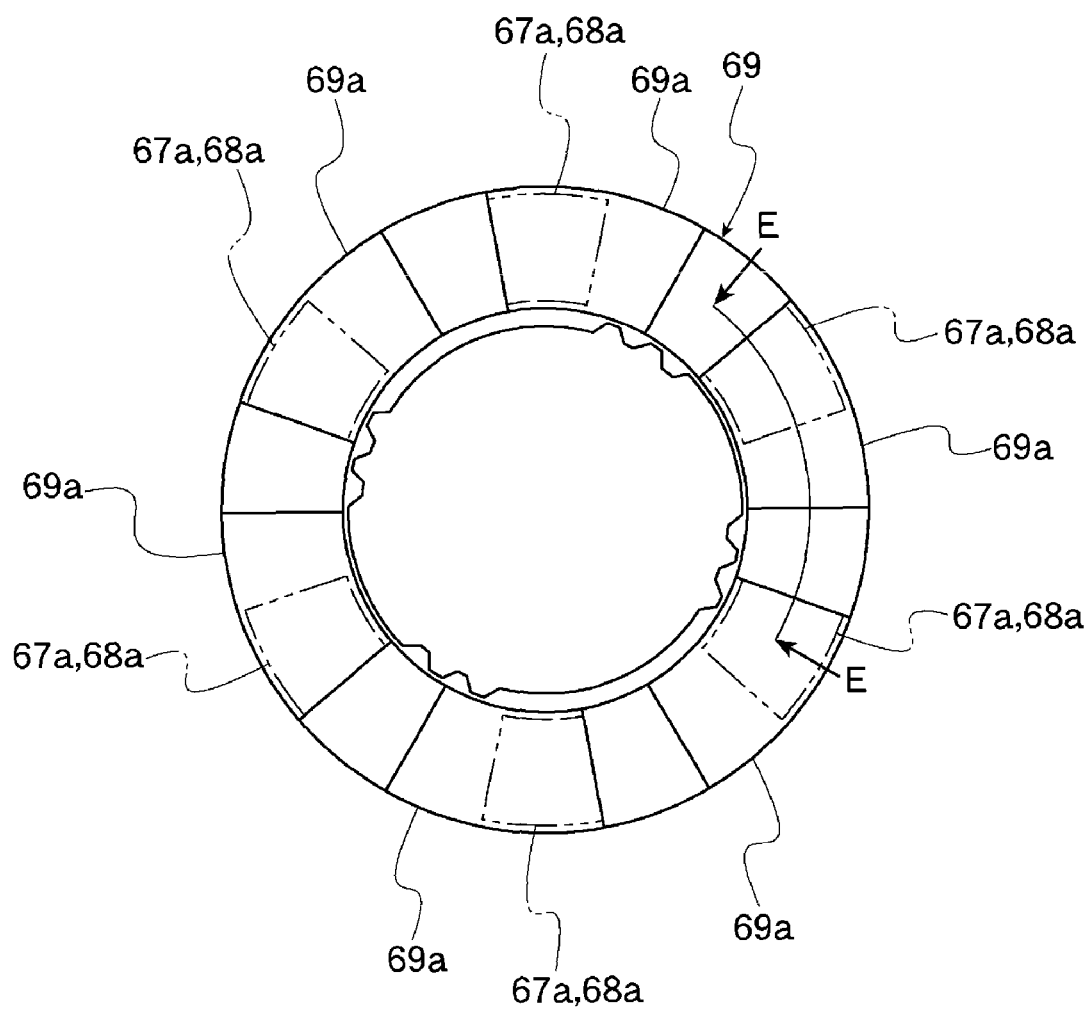
FIG. 15 is a side view of a dog gear used in the conventional clutch mechanism, showing how the dog gear is engaged with the forward gear and with the reverse gear.
Figure 16:
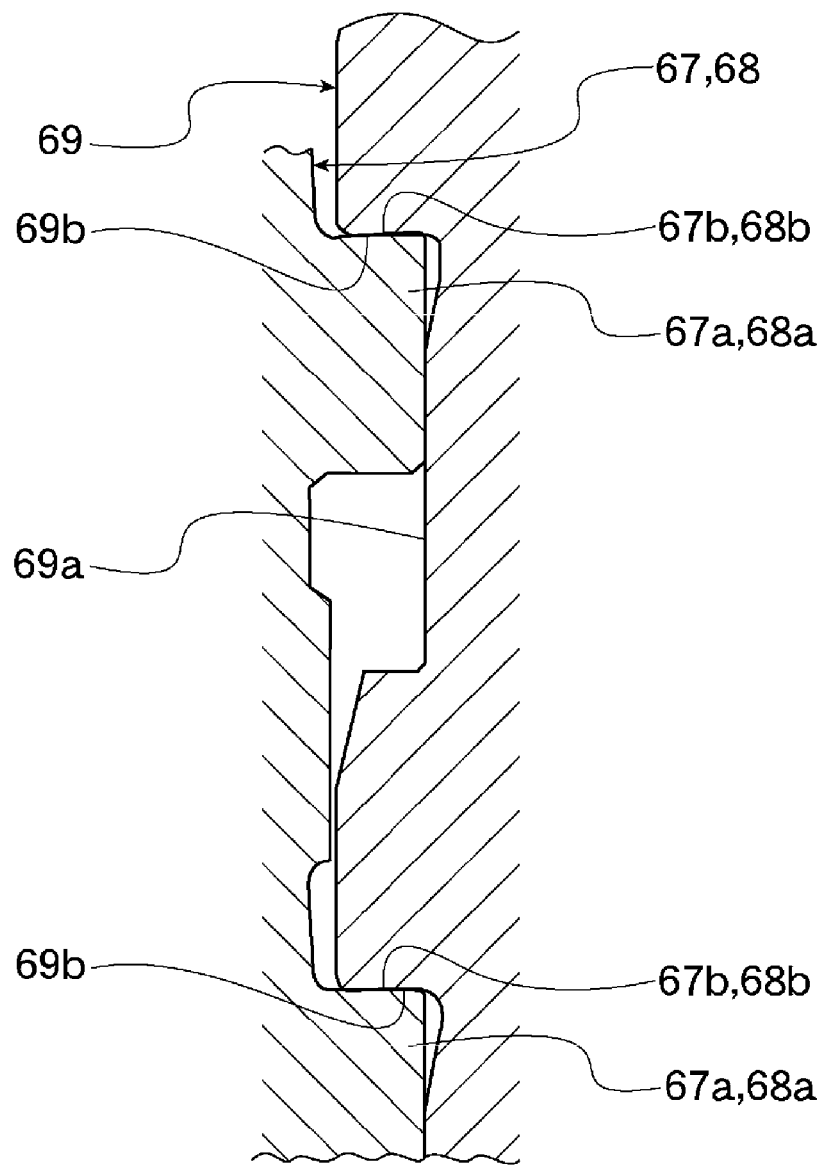
FIG. 16 is a sectional view obtained by cutting away in the circumferential direction along a line E-E in FIG. 15 of the conventional clutch mechanism.

First, when the engaging recesses 36a in the stopped state are moved in the direction of arrow "Y" while the engaging projections 31a are moving in the direction of arrow "X", the tops 37a between the engaging recesses 36a are abutted with pressure against the top surfaces 31e of the engaging projections 31a, as shown in FIG. 13(a). Then, as shown in FIG. 13(b), the tops 37a slide on the top surfaces 31e of the engaging projections 31a to reach the slopes 37b. As shown in FIG. 13(c), the tops 37a continue to move along the contour of the slopes 37b, and the engaging recesses 36a are guided toward the engaging projections 31a. Once the engaging recesses 36a reach the position of the engaging projections 31a, as shown in FIG. 13(d), the front ends of the driving force transmitting surface 35b in the engaging recesses 36a are abutted against the outer edges of the driving force transmitting surface 31b on the engaging projections 31a, resulting in the engaging projections 31a being disposed at the predetermined position in the engaging recesses 36a. Consequently, the engaging projections 31a fit into the engaging recesses 36a, and the dog gear 35 and the forward gear 31 are engaged with the driving force transmitting surfaces 31b, 35b on both portions being firmly abutted against each other.

As the dog gear 35 and the forward gear 31 are engaged in this way, the driving force from the drive shaft 21 is transmitted to the dog gear 35 by way of the forward gear 31, and then transmitted to the output shaft 29 by the spline teeth 35c of the dog gear 35, to rotate the output shaft 29 and the propeller 27 in the direction of forward travel.

To travel backwards, the shift rod 47 is turned in the opposite direction by the shift lever 49, the shift follower 45 and the shift plunger 43 are moved in the opposite direction by the cam 55 on the shift rod 47, and the dog gear 35 is moved toward the propeller 27 on the output shaft 29, to cause the dog gear 35 to engage with the reverse gear 33 in a similar manner to that described above.

According to the outboard motor 10 having the clutch mechanism 25 configured as described above, each of the engaging areas 31d, 33d, and 35d on the forward gear 31, reverse gear 33, and dog gear 35 respectively face each other, and have engaging projections 31a, 33a and engaging recesses 36a located radially inside of the input gears 31c, 33c. Thus, the engaging projections 31a, 33a and the engaging recesses 36a are disposed in the limited space between the input gears 31c, 33c and the output shaft 29. Consequently, the dimensions of the engaging projections 31a, 33a and the engaging recesses 36a are significantly restricted.

However, despite such a restricted space, damage including breakage, cracking, or deformation of the engaging projections 31a, 33a and the engaging recesses 36a is prevented at the time of engagement or when transmitting the driving force in the engaged state, even when a large driving force is transmitted to the output shaft 29 by a drive system having a maximum output power over about 300 ps. This is because preferably seven or more of the engaging projections 31a, 33a and the engaging recesses 36a are provided, and at the time of engagement, the transmitted torque is dispersed to the driving force transmitting surface 31b, 33b, 35b defined by the surfaces of the engaging projections 31a, 33a and the engaging recesses 36a facing each other in the circumferential direction. Such damage can be prevented adequately even when a torque of about 60 kgm or larger must be transmitted by the clutch mechanism 25, for instance.

The preferred embodiments described above can be altered as appropriate within the scope of the present invention. For instance, the slopes 37b preferably are provided only on the dog gear 35 in the case described above. However the slopes may be provided on the forward gear 31 and the reverse gear 33, or it is possible to provide the slopes on the forward gear 31, reverse gear 33, and also the dog gear 35.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A clutch mechanism for an outboard motor comprising:
    a forward gear and a reverse gear arranged to rotate freely around an output shaft to drive a propeller, each of the forward gear and the reverse gear including an input gear driven by a drive gear on a drive shaft so as to rotate in opposite directions; and
    a dog gear disposed around the output shaft between the forward gear and the reverse gear, the dog gear arranged to be movable in an axial direction relative to the output shaft and to be rotationally immovable in a circumferential direction relative to the output shaft; wherein
    a plurality of engaging projections on engaging areas of the forward gear and the reverse gear are arranged to be engaged with a plurality of engaging recesses on engaging areas of the dog gear;
    the dog gear is arranged to be engaged with either the forward gear or with the reverse gear resulting in the plurality of engaging recesses being engaged with the plurality of engaging projections to drive the output shaft;
    the engaging projections and the engaging recesses are located radially inside the input gears, and include at least seven and no more than ten of the engaging projections and the engaging recesses, respectively, in a row along a circumference of the forward gear, the reverse gear, and the dog gear;
    the engaging projections and the engaging recesses are located radially outside of a center axis of the output shaft in a range of about 20 mm to about 32 mm from the center axis;
    at the time of engagement, a transmitted torque is dispersed to driving force transmitting surfaces defined by surfaces of the engaging projections and the engaging recesses facing each other in the circumferential direction; and
    a sloping portion is arranged on tops of engaging portions between the engaging recesses of the dog gear and at least one of tops of the engaging projections of the forward gear and tops of the engaging projections of the reverse gear to guide the engaging projections into the engaging recesses.

2. The clutch mechanism of an outboard motor according to claim 1, wherein an aggregate area of all the driving force transmitting surfaces on the engaging areas of the forward gear and the dog gear, and on the engaging areas of the reverse gear and the dog gear is at least about 340 mm$^2$.

3. The clutch mechanism of an outboard motor according to claim 1, wherein an outer edge on each driving force transmitting surface is arranged to be aligned in a direction substantially perpendicular to an axial direction of the output shaft, and an aggregate length of all the outer edges on each of the engaging areas is at least about 70 mm.

4. The clutch mechanism of an outboard motor according to claim 1, wherein an aggregate area of all the driving force transmitting surfaces on the engaging areas of the forward gear and the dog gear, and on the engaging areas of the reverse gear and the dog gear is at least about 390 mm$^2$.

5. The clutch mechanism of an outboard motor according to claim 1, wherein the engaging projections and the engaging recesses include nine of the engaging projections and the engaging recesses, respectively, in a row along a circumference of the forward gear, the reverse gear, and the dog gear.

6. The clutch mechanism of an outboard motor according to claim 1, wherein each of the engaging projections has a length along the circumference of the forward gear and the reverse gear that is smaller than a length of each of the engaging recesses along the circumference of the dog gear by more than 3 degrees to about 12 degrees in terms of an angle about the center axis of the output shaft.

* * * * *